Nov. 19, 1968   W. A. HERPICH ET AL   3,411,645
REFUSE COLLECTING VEHICLE FORWARD TILT BODY
Filed June 9, 1966   4 Sheets-Sheet 1
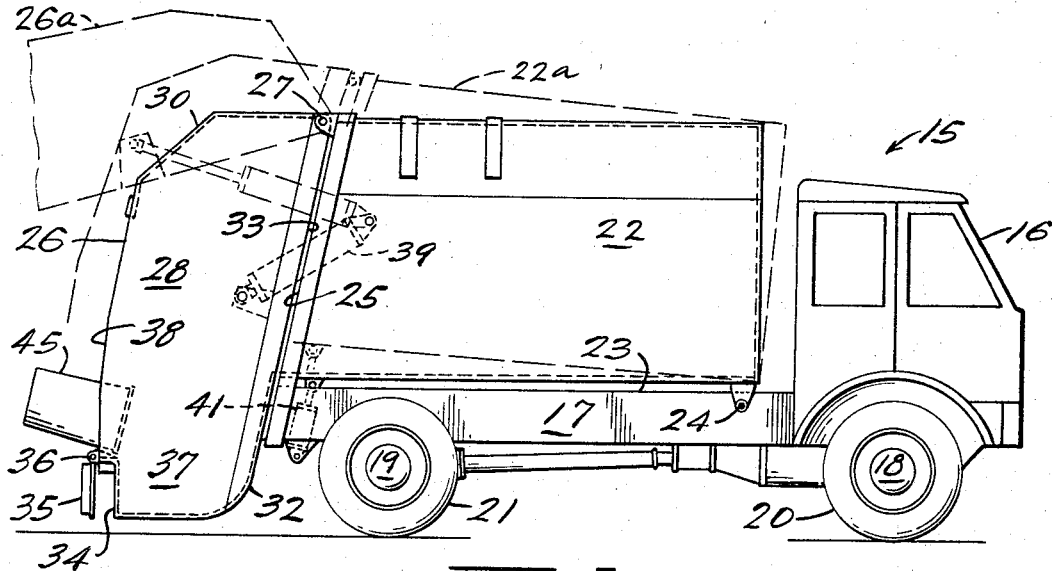
FIG-1-
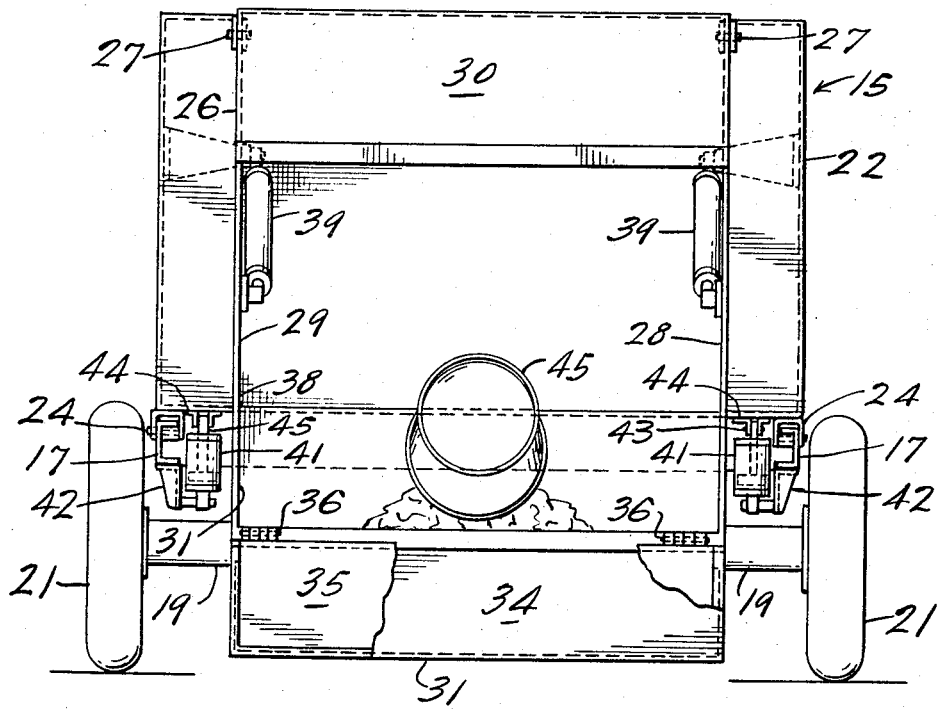
FIG-2-
INVENTORS:
WILLIAM A. HERPICH.
GEORGE W. PALMER.
BY
Owen & Owen
ATT'YS.

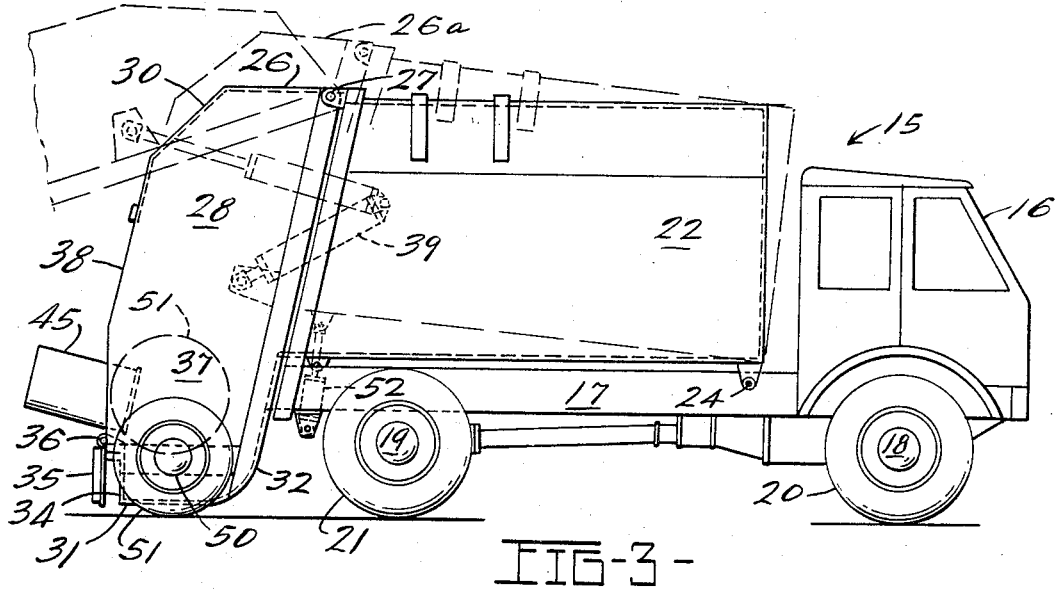
FIG-3-
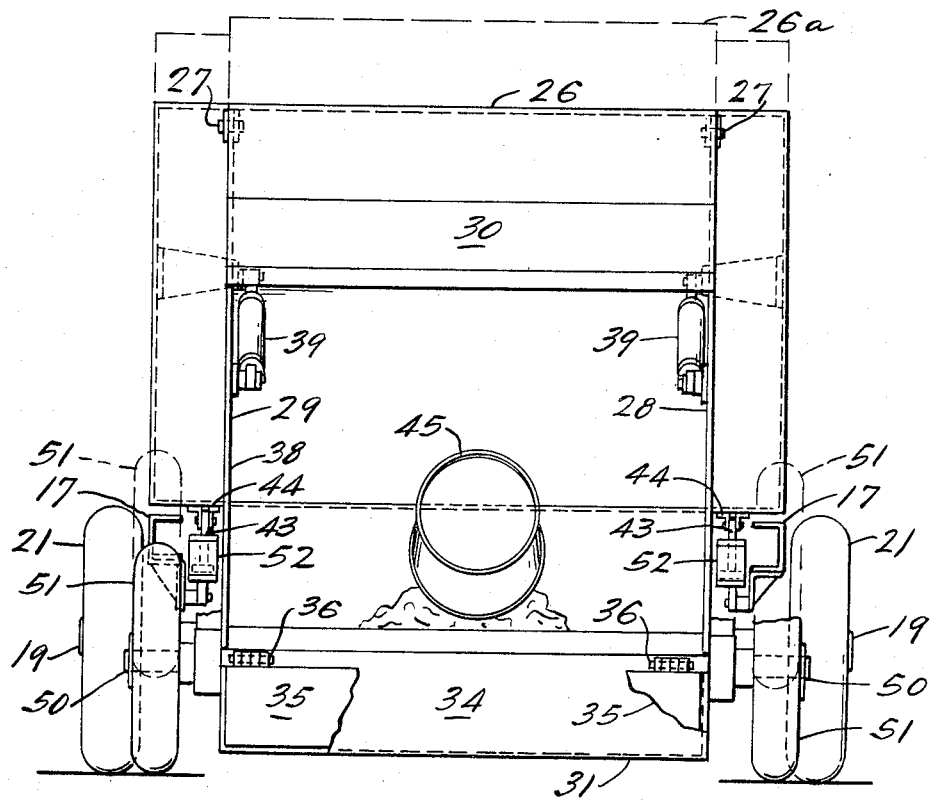
FIG-4-

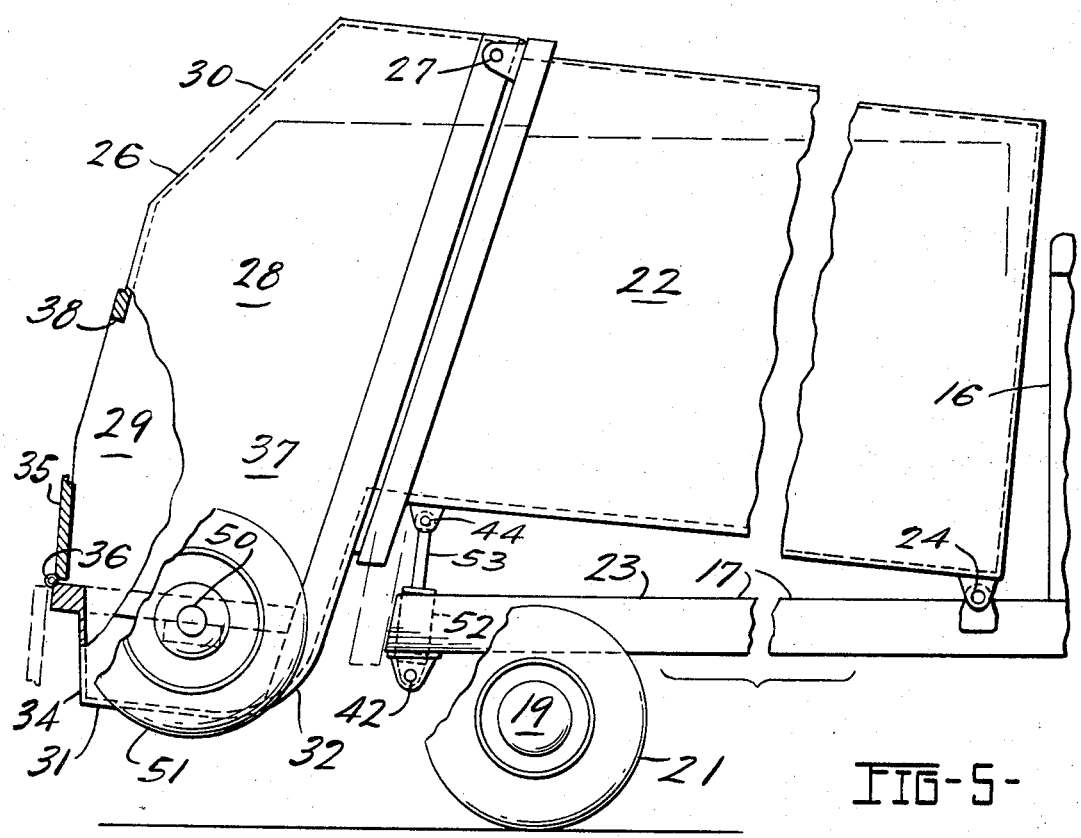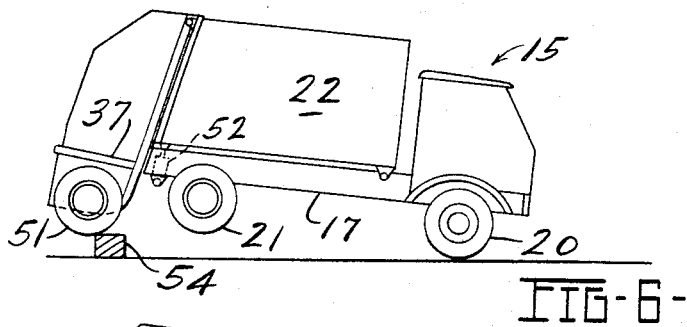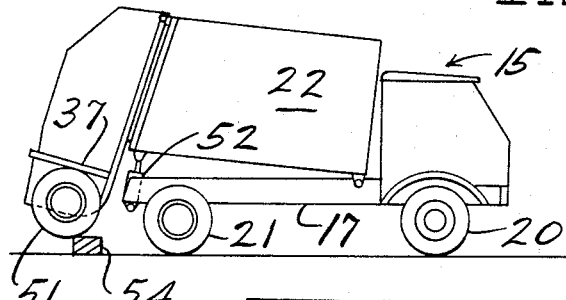

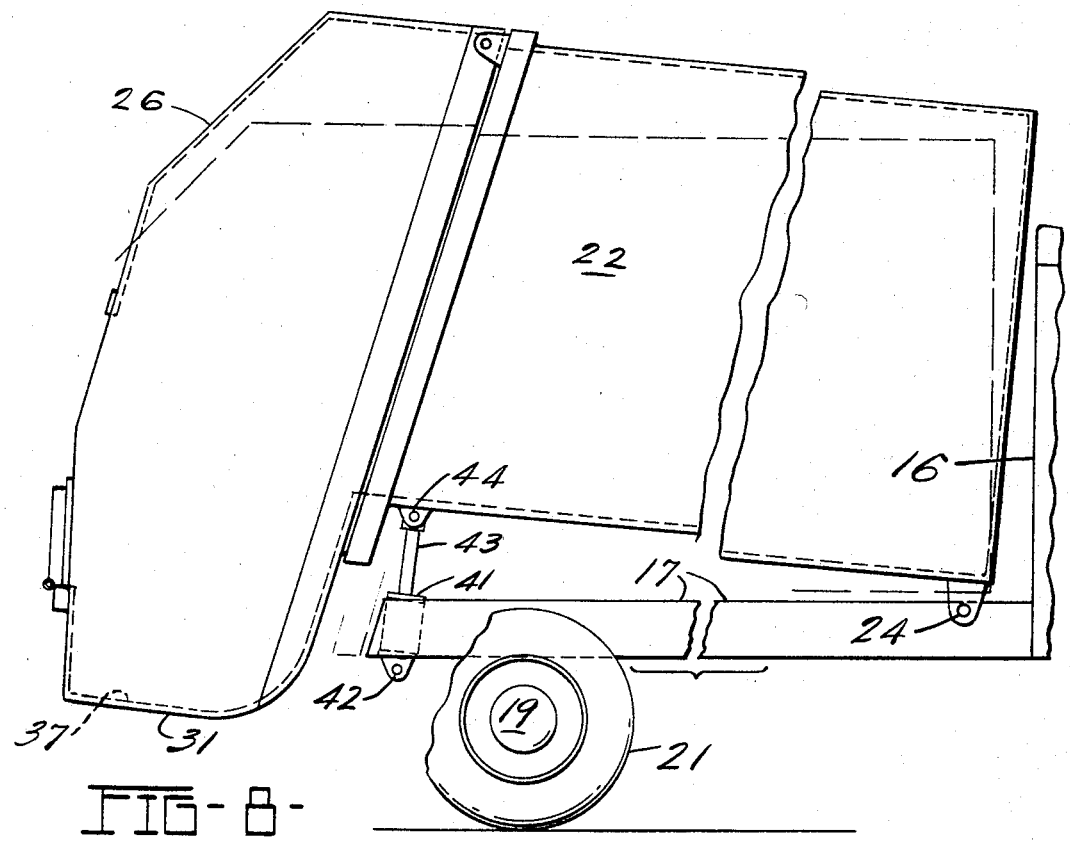
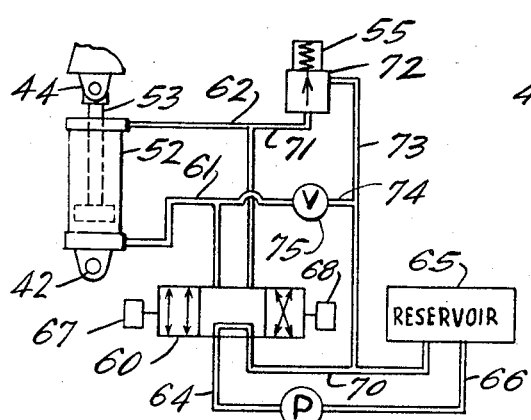
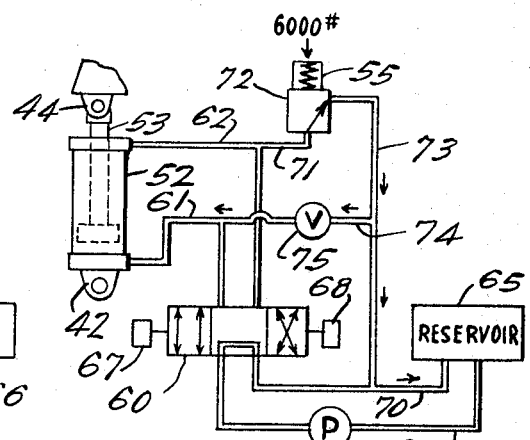

United States Patent Office 3,411,645
Patented Nov. 19, 1968

3,411,645
REFUSE COLLECTING VEHICLE
FORWARD TILT BODY
William A. Herpich and George W. Palmer, Galion, Ohio,
assignors to Hercules Galion Products, Inc., Galion,
Ohio, a corporation of Delaware
Filed June 9, 1966, Ser. No. 556,343
4 Claims. (Cl. 214—503)

ABSTRACT OF THE DISCLOSURE

A rear loading refuse vehicle that has a chassis with front and rear axles and wheels and that has a hollow body pivotally connected to the chassis at the front lower end of the body. A tailgate is pivotally mounted at the upper rear end of the body and extends downwardly across the open rear end of the body. The tailgate has a hopper in its lower end and mechanism for moving refuse out of the hopper into the body. The bottom of the hopper depends below the level of the rear axle and the hopper has a rear wall which extends upwardly and terminates at a level low enough relative to the ground so as to minimize the elevation to which containers must be lifted for dumping them into the hopper. Power means are connected between the chassis and the body for tilting the body about its pivotal connection to the chassis to raise the bottom of the hopper to the level of the rear axle for clearing surface obstructions during transportation.

---

This invention relates to refuse collecting vehicles of the type customarily employed on city streets for the collection of trash, garbage and other refuse. More particularly, this invention relates to a refuse collecting vehicle having a pivotal refuse body.

Refuse collecting vehicles often have loading hoppers at the rear of the vehicles. Refuse workers dump refuse into the hoppers from containers which are placed at the curbs of the streets or on loading docks. These containers can be quite heavy when loaded with refuse or rubbish and it is desirable to have the hopper loading opening at a convenient elevation to eliminate excessive lifting of containers by the refuse workers.

It is therefore the principal object of the present invention to provide a refuse collecting vehicle having a refuse body which is pivotally mounted at its front end and which includes tilt means for adjusting the elevation of the rear end of the pivotally mounted refuse body.

It is another object of the present invention to provide a rear end loader type refuse collecting vehicle having a tiltable refuse body and auxiliary load bearing wheels mounted adjacent the vehicle tailgate.

It is a still further object of the present invention to provide a rear end loading type refuse collecting vehicle having means responsive to a predetermined load on an auxiliary axle or wheels wherein the refuse body is tilted with respect to the chassis when the predetermined load is exceeded.

Further objects of this invention will become apparent from the specification and drawings in which:

FIG. 1 is a side elevational view of a refuse collecting vehicle, according to the present invention, and showing in dashed lines an elevated position of the refuse body and the tailgate in elevated positions;

FIG. 2 is a rear view of the refuse collecting vehicle shown in FIG. 1, drawn on an enlarged scale, and showing a container being dumped into a refuse hopper located in the tailgate of the vehicle;

FIG. 3 is a side elevational view, similar to FIG. 1, showing another embodiment of the present invention wherein a pair of auxiliary wheels are mounted adjacent the sidewalls of the tailgate;

FIG. 4 is a rear view of the embodiment shown in FIG. 3, drawn on an enlarged scale;

FIG. 5 is a fragmentary, side elevational view, of the embodiment shown in FIG. 3 and showing the refuse body in an elevated position;

FIG. 6 is a diagrammatic view showing a refuse collecting vehicle, according to the present invention, at the instant the auxiliary wheels encounter a roadway obstacle;

FIG. 7 is a diagrammatic view, similar to FIG. 6, and showing the vehicle after the refuse body has tilted relative to the chassis;

FIG. 8 is a fragmentary view, of the embodiment shown in FIG. 1, and showing the refuse body in an elevated position;

FIG. 9 is a diagrammatic view of the hydraulic system of the embodiment shown in FIG. 3; and FIG. 10 is a diagrammatic view, similar to FIG. 9, showing the hydraulic system after a pressure responsive switch has been actuated.

Briefly, the invention relates to a refuse collecting vehicle having a horizontally extending main chassis and an enclosed refuse body positioned on the chassis. The refuse body defines a refuse opening at its rear end and is pivotally mounted adjacent its front end to the chassis. Tilt means are provided for elevating the rear end of the refuse body with respect to the chassis. The rear end of the refuse body can be moved between a lowered position, wherein the rear end is adjacent the chassis and an elevated position, wherein the rear end is vertically spaced from the chassis. Normally, a tailgate, having a loading hopper, is mounted adjacent the rear end of the refuse body.

Referring to FIG. 1, a refuse collecting vehicle embodying the present invention is generally indicated by the reference number 15. The vehicle 15 has a cab 16 which is mounted on a longitudinally extending chassis 17. A front axle 18 and a rear axle 19 are connected to the vehicle chassis 17 in a normal manner. The front axle 18 mounts front wheels 20 at its outer ends and, similarly, the rear axle 19 mounts rear wheels 21 at its outer ends.

A hollow, generally rectangular refuse body 22 overlies a bed portion 23 of the vehicle chassis 17 and is pivotally connected to the chassis 17, at a point adjacent the cab 16, by pivot pins 24.

An ejection plate (not shown) is normally slidingly mounted within the refuse body 22. The ejection plate is utilized to compress uncompacted refuse and also to eject the refuse load from the body 22.

The refuse body 22 has a refuse opening 25 at its rear end and a tailgate 26, as a unit, is pivotally mounted at the upper rear end of the refuse body 22 by a pivot rod 27. The tailgate 26 includes opposed vertical and parallel sidewalls 28 and 29. A top 30 and a bottom 31 extend between the sidewalls 28 and 29. A front wall 32 extends generally upwardly from the bottom 31 terminating at a position adjacent the bottom of the refuse opening 25 of the body 22. The front wall 32, sidewalls 28 and 29, and top 30 of the tailgate 26 define a tailgate opening 23 which is complementary with the refuse opening 25 of the refuse body 22.

In the present embodiment, a rear wall 34 extends upwardly from the bottom 31. The rear wall 34 includes a hopper door 35 which is pivotally mounted on a horizontal axis by a pivot rod 36. The door 35 is movable between a closed position and an open position.

The sidewalls 28 and 29, the bottom 31, the front wall 32, and the rear wall 34 form a refuse receiving hopper generally indicated by the reference number 37. The sidewalls 28 and 29, the top 30, and the bottom 31 define a hopper opening 38 through which refuse is dumped into the refuse hopper 37 as shown in FIG. 2.

A packer blade (not shown) is normally mounted for movement within the tailgate 26 for moving refuse out of the hopper 37, through the communicating openings 33 and 25, and into the interior of the refuse body 22.

A hydraulic cylinder 39 is operatively connected between the refuse body 22 and the tailgate 26. During a dumping cycle, the cylinder 39 is extended moving the tailgate 26 from the closed position shown in FIG. 1 to an open position 26a, indicated by the dashed lines in FIG. 1. When in the open position, the ejection plate (not shown) is moved rearwardly within the refuse body 22 to eject the load of refuse from the body.

When in its closed position, the tailgate 26 is connected to the rear of the refuse body 22 by a plurality of latches (not shown). These latches are effective to transfer external forces from the tailgate 26 to the refuse body 22.

Referring to FIGS. 1 and 2, tilt means for moving the rear end of the refuse body 22 with respect to the chassis 17 are provided. In the present embodiment, the tilt means comprises a pair of single acting hydraulic cylinders 41 which are connected to the chassis 17 by chassis mounting brackets 42. Each of the hydraulic cylinders 41 has a cylinder rod 43 which is pivotally mounted to the refuse body 22 by a bifurcated bracket 44.

Referring to FIGS. 1 and 8, the single acting hydraulic cylinders 41 are effective to move the rear end of the refuse body 22 between a lowered position shown in FIG. 1, wherein the refuse body 22 is adjacent the chassis 17, and an elevated position shown in FIG. 8, wherein the rear end of the refuse body 22 is vertically spaced from the chassis 17.

When the vehicle 15 is operated on, for example, a level residential street, the refuse body 22 is placed in the lowered position shown in FIG. 1. After the packer blade (not shown) sweeps the refuse within the hopper 37 into the body 22, the hopper door 35 is lowered to the position shown in FIG. 1. A worker may now take a refuse container 45 (see FIG. 2) from the curb or roadway and dump the contents of the refuse directly into the hopper 37 without being required to lift the container 45 to an excessive height. After the hopper 37 is filled to approximately one-half of its total depth, the hopper door 35 is closed and latched. The worker must now lift the container 45 a greater distance, however, the bottom 31 of the tailgate 26 is much closer to the street elevation in vehicles according to the present invention than are the tailgates of prior art vehicles.

When the above operation has been repeated several times and the refuse body 22 is filled with refuse, the cylinders 41 are actuated and the refuse body 22 is tilted to an elevated position as illustrated in FIGURE 8. When this occurs, the clearance between the bottom 31 and the street is substantially increased and the vehicle 15 may be driven at higher speeds over rough roads to a remote dumping area.

It is also desirable to tilt the body 22 to an elevated position when refuse is being loaded into the hopper 37 from, for example, a factory loading dock. In this situation, the hydraulic cylinders 41 are actuated and the rear end of the refuse body 22 is elevated until the desired vertical positioning of the hopper 37 is achieved.

In the present embodiment, the cylinders 41 are disclosed as being single acting cylinders. Referring to FIG. 1, if the front wall 32 or the bottom 31 of the tailgate 26 strikes a roadway obstacle, the hopper 37 is free to move upwardly because no hydraulic forces are holding the refuse body 22 in the down or lowered position.

It should be clearly understood that other types of tilt means may be utilized, and the present invention is not limited to the use of single acting cylinders.

Referring to FIGS. 3, 4, and 5, a second embodiment of a refuse collecting vehicle according to the present invention is shown. In this embodiment, a pair of stub axles 50 (see FIG. 4) are mounted on the sidewalls 28 and 29 of the tailgate 26 adjacent the hopper 37. The stub axles 50 in turn mount auxiliary wheels 51. The auxiliary wheels 51 normally carry a portion of the load which is imposed upon the wheels 20, 21 and 51, by refuse within the body 22 and the hopper 37.

In this embodiment, the tilt means comprises a pair of double acting hydraulic cylinders 52. Each of the cylinders 52 is connected to the chassis 17 by the chassis mounting bracket 42. Referring to FIG. 5, a cylinder rod 53 is pivotally mounted to the refuse body 22 by the bifurcated bracket 44.

The cylinders 52 are effective to tilt the refuse body 22 relative to the chassis 17 in the same manner as was described above with respect to the embodiment shown in FIG. 1.

FIGS. 6 and 7 diagrammatically show how an excessive load is transferred from the auxiliary wheels 51 to the rear wheels 21. FIGURES 9 and 10 show a hydraulic system, according to the present invention, for performing this load transferring operation. Referring to FIG. 6, the auxiliary wheels 51 are shown at the instant they encounter an obstacle 54 in their path. In this situation, the rear wheels 21 are no longer in a load carrying position and the entire load is carried by the auxiliary wheels 51 and the front wheels 20. A pressure responsive switch 55 (see FIGS. 9 and 10) is positioned in sensing relationship with the auxiliary axles 50. When a predetermined load, for example 6000 pounds, is placed upon the pressure responsive switch 55 the double acting hydraulic cylinders 52 are actuated and the refuse body 22 is tilted with respect to the chassis 17 of the vehicle 15.

Referring to FIG. 6, the load imposed upon the auxiliary wheels 51 exceeds the predetermined load limit and the pressure responsive switch 55 is actuated. The refuse body 22 is tilted with respect to the chassis 17. In the present situation, this lowers the chassis 17 until the wheels 21 are again in ground engaging and load carrying position. When this occurs the load is again carried by the three pairs of wheels 20, 21, and 51.

The hydraulic system for effecting actuation of the hydraulic cylinders 52 is shown schematically in FIGURES 9 and 10 and includes a main control valve 50 connected through a pair of lines 61 and 62 to the opposed ends of the cylinders 52. A conventional hydraulic pump 63 is connected on its discharge side to the main valve 60 through a line 64. The intake side of the pump 63 is connected through a line 66 to a reservoir 65. The control valve 60 is a conventional 4-way valve including a conventional valve spool (not shown). The actuation of a switch 67 permits flow of fluid under pressure from the line 64, through the line 61, to the bottom end of the cylinders 52. This advances the cylinder rods 53 and the refuse body 22 is tilted to an elevated position.

Similarly, when a switch 68 is actuated, the valve spool is moved to a position to permit flow of fluid under pressure through the line 62, to the upper portions of the cylinders 52. This retracts the cylinder rods 53 and lowers the refuse body 22 with respect to the chassis 17.

In a normal operation, when it is desired to raise or elevate the refuse body 22, the switch 67 is actuated and, as explained above, fluid under pressure flows through the lines 64 and 61 to the cylinders 52 extending the cylinder rods 53 and elevating the body 22. At the same time, fluid is forced through the line 62 and a line 70 to the reservoir 65. To lower the refuse body 22, the switch 68 is actuated and the main valve spool is shifted moving fluid under pressure through the lines 64 and 62 into the cylinders 52 forcing the pistons downwardly, retracting the cylinder rods 53 thereby lowering the refuse body 22. At the same time, fluid is forced from the bottom of the cylinders 52 through the lines 61 and 70 to the reservoir 65.

Referring to FIG. 9, a line 71 is in communication with the line 62 and a normally open hydraulic valve 72. The pressure responsive switch 55 is operatively connected to the hydraulic valve 72 and is effective to move the hydraulic valve 72 from the normally open position shown in FIG. 9 to a closed position shown in FIG. 10. A line 73 extends between the hydraulic valve 72 and the line 70. A by-pass line 74 containing a hydraulic check valve 75 communicates between the line 73, the line 61, and the cylinders 52.

When the pressure responsive switch 55 is actuated, for example when the auxiliary wheels 51 pass over the obstacle 54 as shown in FIG. 6, the valve 72 is moved to the closed or fluid transmitting position. When this occurs fluid from the cylinders 52 flows through the lines 62, 71, through the valve 72, and into the line 73. The fluid then enters the line 70 and dumps into the reservoir 65. At the same time, fluid passes into the by-pass line 74, through the check valve 75, the line 71 and into the cylinders 62. When this occurs the cylinder rods 53 are extended and the refuse body 22 is tilted relative to the chassis 17. When the load on the pressure responsive switch 55 is removed or falls below the predetermined load limit, the hydraulic valve 72 is returned to its normally open or non-transmitting position shown in FIGURE 9. The switches 67 and 68 adjacent the main control valve 60 may either be manually operated or solenoid operated, as is known in the art.

The force or load imposed upon the pressure responsive switch 55 may be the result of the vehicle 15 encountering an obstacle, for example the obstacle 54 shown in FIGS. 6 and 7, or such an excessive load may result from overloading the hopper 37. If the hopper 37 is overloaded, the refuse body is tilted with respect to the body 17 and this transfers the center of gravity of the load. This places a greater load on the rear wheels 21 and reduces the load on the auxiliary wheels 51. If the load on the auxiliary wheels 51 is an amount less than the predetermined load the normal operating procedure may again be resumed. In the alternative corrective measures may be taken, for example, a reduction of the hopper loading. The spacing or distance between the rear axle 19 and the auxiliary axles 50 is an important factor in the distribution of the load upon the various wheels.

While the present invention has been disclosed in connection with a specific arrangement and disposition of the parts, it should be expressly understood that numerous modifications and changes may be made without departing from the scope of the appended claims.

We claim:
1. In a refuse vehicle having a main chassis with front and rear axles and wheels thereon and an enclosed refuse body with an open rear end, the improvement consisting of pivot means connecting the front lower end of said body to said chassis, a tailgate pivotally mounted at the upper side of said open rear end and extending downwardly across said open rear end, a receiving hopper in the lower end of said tailgate, the bottom of said hopper and said tailgate depending substantially below the level of said rear axle, said hopper having an upwardly extending rear wall terminating at a level to provide an opening such that the elevation to which an operator must lift a container to be dumped through said opening into said hopper is minimized, power means for elevating the rear of said body and said tailgate relative to said chassis for tilting said body about said front pivot to raise the bottom of said tailgate to a level substantially the same as said rear axle for clearing surface irregularities during transportation, and means for moving refuse out of said hopper and into said body.

2. Apparatus according to claim 1 and at least one pair of auxiliary surface contacting wheels mounted on said tailgate at a level for contacting a surface when said refuse body and said tailgate are in lowered position.

3. Apparatus according to claim 1 and a hopper door pivotally mounted along the horizontal line at the upper edge of said rear wall of said hopper and movable between an upper closed position and a lowered open position.

4. Apparatus according to claim 2 in which the power means for elevating the rear of said body comprises a hydraulic system including double acting hydraulic cylinders and which has pressure responsive means in the hydraulic system for sensing a predetermined upward force on said auxiliary wheels and actuating said cylinders for tilting said body when said auxiliary wheels engage a surface irregularity.

References Cited
UNITED STATES PATENTS

| | | | |
|---|---|---|---|
| 1,781,346 | 11/1930 | Schmidt | 214—503 |
| 1,821,327 | 9/1931 | Scott | 214—38 |
| 2,606,674 | 8/1952 | Edwards | 214—501 |
| 2,706,058 | 4/1955 | De Graaff | 214—503 |
| 3,229,832 | 1/1966 | Ferrari et al. | 214—503 |

ALBERT J. MAKAY, *Primary Examiner.*